(12) United States Patent
Lokkinen

(10) Patent No.: US 10,386,008 B2
(45) Date of Patent: Aug. 20, 2019

(54) INSTALLATION DEVICE

(71) Applicant: Picote Solutions Oy Ltd., Porvoo (FI)

(72) Inventor: Mika Lokkinen, Porvoo (FI)

(73) Assignee: Picote Solutions Oy Ltd., Porvoo (FI)

( * ) Notice: Subject to any disclaimer, the term of this patent is extended or adjusted under 35 U.S.C. 154(b) by 0 days.

(21) Appl. No.: 15/880,121

(22) Filed: Jan. 25, 2018

(65) Prior Publication Data

US 2019/0226624 A1 Jul. 25, 2019

(51) Int. Cl.
*F16K 43/00* (2006.01)
*F16L 55/179* (2006.01)
*F16L 55/165* (2006.01)
*E03F 3/06* (2006.01)

(52) U.S. Cl.
CPC .............. *F16L 55/179* (2013.01); *E03F 3/06* (2013.01); *F16L 55/1656* (2013.01); *E03F 2003/065* (2013.01)

(58) Field of Classification Search
CPC ................. F16L 55/164; F16L 55/1645; F16L 55/16455; F16L 55/1656; F16L 55/179; E03F 2003/065
See application file for complete search history.

(56) References Cited

U.S. PATENT DOCUMENTS

| | | | | |
|---|---|---|---|---|
| 4,872,253 A * | 10/1989 | Carstensen | ......... | F16L 55/1645 29/507 |
| 5,244,624 A * | 9/1993 | Steketee, Jr. | .......... | B26D 3/163 156/287 |
| 5,673,469 A * | 10/1997 | Dickson | ................ | F16L 55/165 138/97 |
| 6,171,435 B1 * | 1/2001 | Stoves | .................. | F16L 55/179 138/97 |

* cited by examiner

*Primary Examiner* — Reinaldo Sanchez-Medina
(74) *Attorney, Agent, or Firm* — Fasth Law Offices; Rolf Fasth

(57) ABSTRACT

An installation device for installing a branch liner in a branch point of a pipeline is disclosed. The device has a body with an inlet defined therein for fluids and a turning knob is rotatable relative to the body. The turning knob is attached to a first shaft and the opposite end of the first shaft is attached to a first barrel. The device further comprises a second barrel and a second shaft attached between said barrels. The device further comprises a duct extending between the body and the first barrel forming a passage for fluids from the inlet of the body to an area between said first barrel and said second barrel.

7 Claims, 3 Drawing Sheets

INSTALLATION DEVICE

FIELD OF THE INVENTION

The present invention relates to pipe renovation tools and in particular to an installation device for installing a liner to a branch of a pipe system.

BACKGROUND AND SUMMARY OF THE INVENTION

Pipes, such as water and sewage pipes, approaching the end of their service life may be renovated e.g. by lining or coating the inside of an old pipe or by mounting a new pipe into an old pipe. An epoxy resin-impregnated polyester liner, for example, that is inverted into a pipe to be renovated using compressed air, steam or water can be used in lining. After inversion of the liner into the pipe, excess pressure is maintained inside the liner until the epoxy resin cures to its shape conforming to the walls of the old pipe. Modern technology allows even highly complex pipes to be lined.

One of the problems associated with the lining of pipes are joints of separate liners installed in a pipe system, typically at branches and junctions of the pipe system. A certain amount of overlapping of liners is desirable to prevent a leak between the liners. In branches and junctions this is sometimes difficult to implement by using straight tubular liners. Therefore, separate branch pieces have been used to prepare a branch with one layer of liner before lining the pipes which connect to the branch. The branch piece has essentially the same form as the branch, for example, T-shaped branch piece for a T-branch and Y-shaped branch piece for a Y-branch. A number of pulling wires and push rods are connected to the branch piece before installation so that the branch piece can be moved to the branch position. Inside the branch piece, a separate inflatable bladder is connected to an air hose which supplies air to the bladder and pushes the branch piece against walls of the pipe system at the branch position by inflating the bladder. A problem with this installation system is that it is a complicated system with all the wires, rods and hoses. It usually requires access to the branch position through more than one pipe and several employees have to work in cooperation to place the branch piece is correct position by using the pull wires and push rods.

It is an object of the present invention to present a device that alleviates the problems associated with the prior art solutions.

BRIEF DESCRIPTION OF THE DRAWINGS

In the following, the present invention is described in greater detail by means of preferred embodiments with reference to the accompanying drawings, in which.

DETAILED DESCRIPTION OF THE INVENTION

Renovation of pipelines in buildings, such as residential buildings, offices and industrial plants, by using the CIPP (Cured In-Place Pipe) pipe lining method has become common in recent years. The CIPP industry has evolved from leak repairs where a short piece of liner was installed to repair a leaking part of an existing pipe to lining of main lines only to full renovations where every pipe and connection is lined creating a complete new pipeline inside the existing old pipeline. A full renovation requires lining of pipes in various sizes, usually through multiple bends and including many connections. In many cases, branches, such as T-branches or Y-branches of a pipeline, have to be lined with a branch piece prior to lining the pipes which connect at the branch. An installation device is needed to move the branch piece into the branch point, position the branch piece accordingly, and open up the branch piece so that it is positioned against inner walls of the pipes in the branch point. The installation device can be removed from the pipeline once the epoxy resin of the branch piece has cured. After that, the pipes can be lined with liners running through the branch piece or ending within the branch piece with a proper overlap which prevents leaking.

Figure 1:
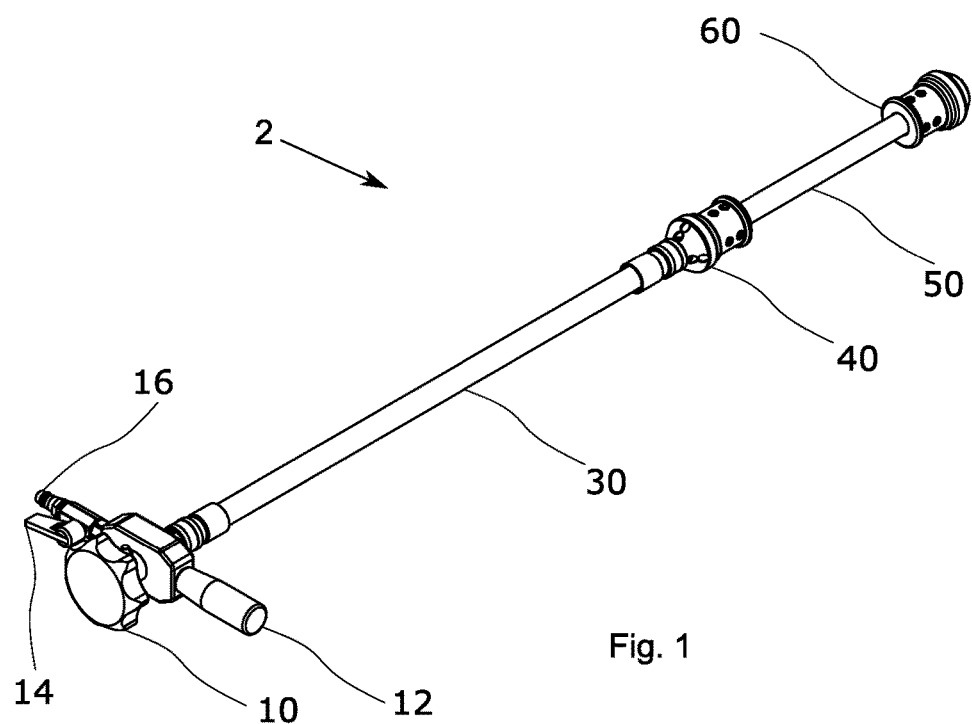
FIG. 1 shows an isometric presentation of a device according to an embodiment of the present invention.

FIG. 1 illustrates an installation device according to an embodiment of the present invention. The installation device can be used for installing a branch piece, made of typical liner material and impregnated with epoxy-resin, to a branch point of a pipe system. Other suitable impregnation resins may also be used. The branch point can, for example be a T-branch wherein two pipes connect in a 90 degree angle or a Y-branch wherein two pipes connect in e.g. 30 to 60 degree angle.

Figure 2:
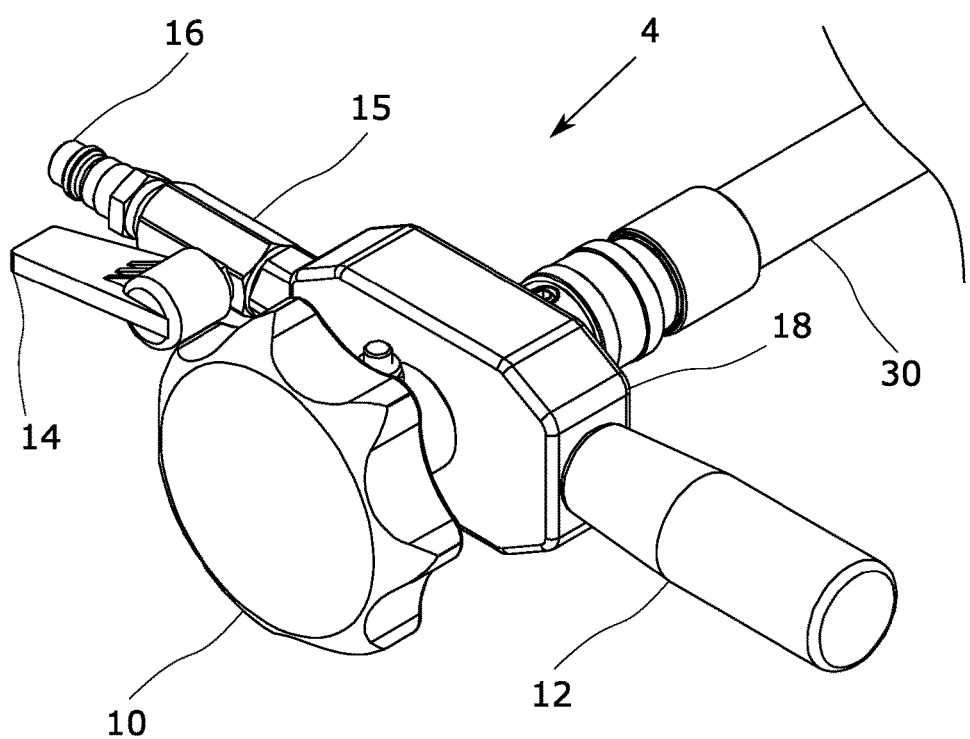
FIG. 2 shows a detail of the device of FIG. 1.
Figures 3, 4, 5:
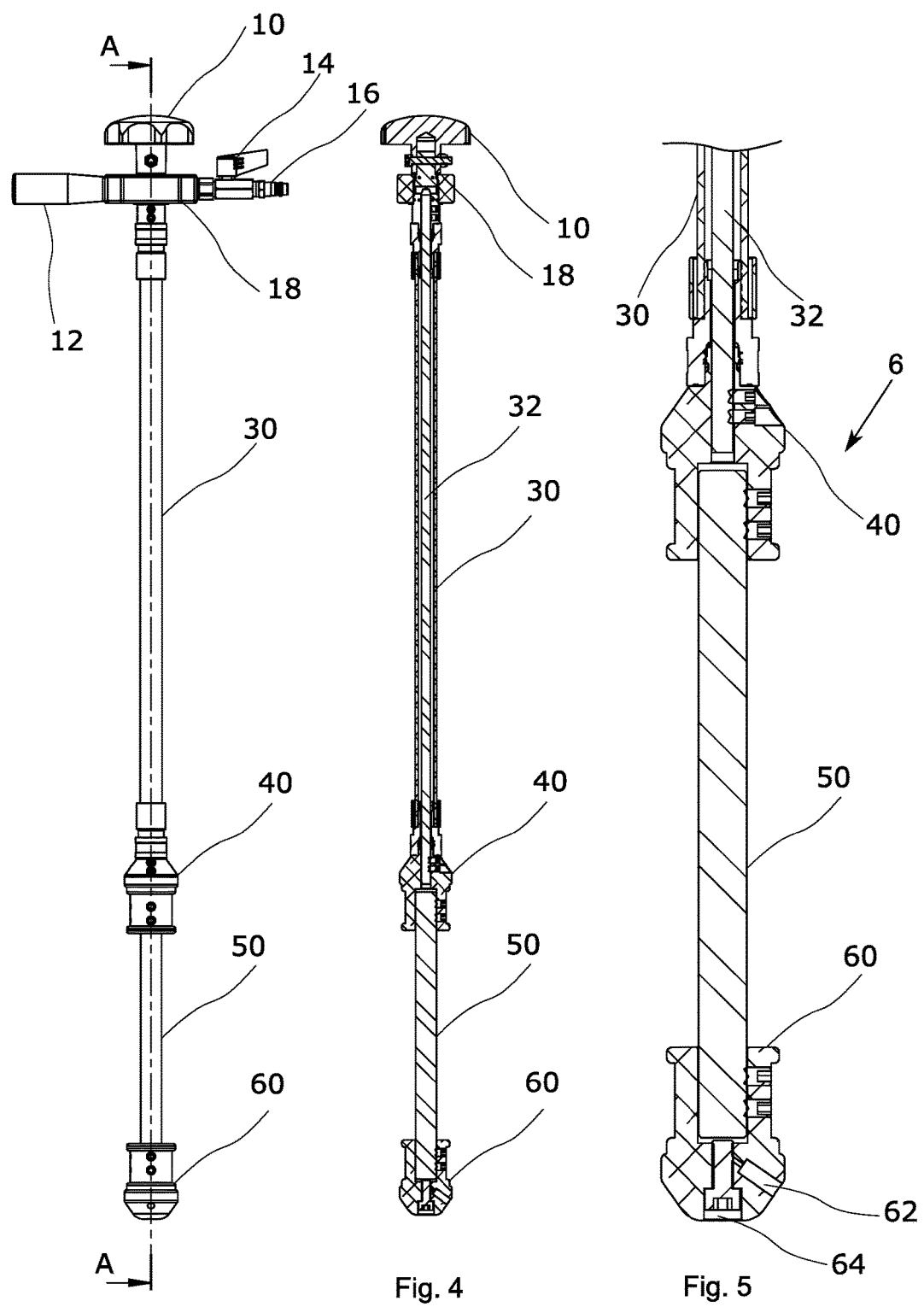
FIG. 3 shows a device according to an embodiment of the present invention.
FIG. 4 shows section A-A of the device of FIG. 3.
FIG. 5 shows lower part of the device of FIG. 4 in detail.
Figure 6:
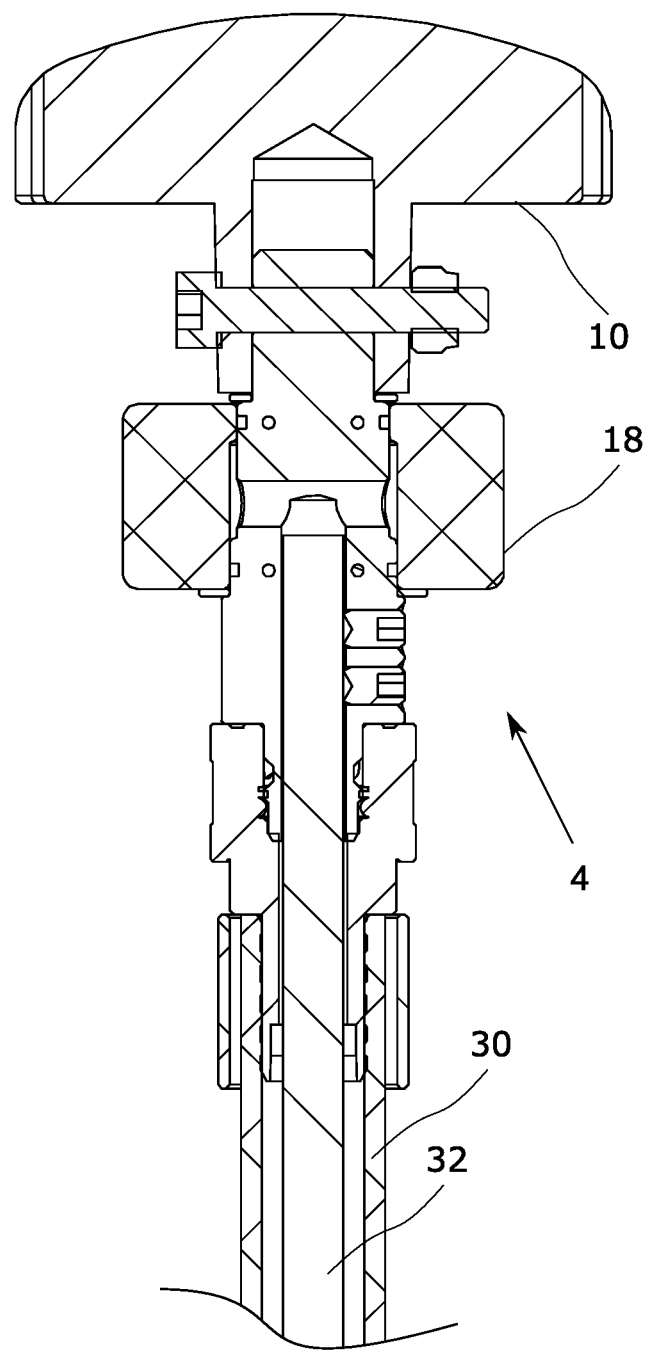
FIG. 6 shows upper part of the device of FIG. 4 in detail.

The installation device 2 of FIG. 1 comprises a control unit 4 at one end of the installation device 2 and an expansion unit 6 at another end of the device opposite to the control unit. The control unit is shown in more detail in FIG. 2 and a section view of the expansion unit 6 is shown in more detail in FIG. 5. FIG. 6 illustrates a section view of the control unit 4. FIG. 3 shows the installation device and section A-A view is detailed in FIGS. 4 to 6.

The installation device 2 has an elongate duct 30 and a first shaft 32, that is disposed within or inside the duct 30, which connect the control unit 4 and the expansion unit 6. A small air gap or clearance is provided between the duct 30 and the first shaft 32, i.e. the first shaft 32 has a smaller diameter than the inner diameter of the duct 30. Preferably, both, the duct 30 and the first shaft 32 have some flexibility such that those can be pushed in to a pipe (to be lined) having bends and curves. The first shaft 32 is preferably made of metal wires having a core of twisted steel wires and one or more layers of steel wires wound around the core. This structure gives enough flexibility to the first shaft and allows air, steam, water and other fluids to flow within the duct 30 and first shaft 32.

The control unit 4 has a housing or body 18 which is attached to the duct 30 at one end thereof in an air-tight manner. A fluid connection from the outside of the installation device 2 into the inside of the duct 30 is arranged through a conduit inside the body 18. A valve 15 is attached to an inlet of the body 18, which inlet is in fluid communication with the conduit inside the body 18. The valve has a hose connector 16 for connecting a fluid hose to the device. For example, the fluid hose may be a pressured air hose delivering compressed air from a compressor, or a steam hose can be used. The fluid connection or fluid passage thus runs through the hose connector 16, valve 15, conduit and body 18 into the duct 30 via the first shaft 32 which extends from inside the duct 30 to the conduit. The valve 15 has a lever 14 or similar means for closing and opening the valve 15 so that fluid flows into the installation device can be controlled. The control unit has a turning knob 10 which is connected to the first shaft 32 which runs through and inside the duct 30. The turning knob 10 can be rotated relative to the body 18 and rotation of the turning knob 10 rotates the first shaft 32 within the duct 30 but not the duct 30 itself since the duct 30 is attached to the body 18 but not to the knob 10. The body 18 also has a handle 12 that extends outwardly from the body 18. The handle 12 facilitates the handling of the installation device, especially when connecting a hose to the hose connector 16, operating the lever 14 or rotating the turning knob 10.

The duct 30, attached to the body 18 of the control unit at one end, is connected to a first barrel 40 at the opposite end. The connection between the duct 30 and the first barrel 40 is preferably realized with bearings or sliding surfaces between the first barrel 40 and the duct 30 which allow for rotation of the first barrel 40 relative to the duct 30. A seal is preferably used at the connection to prevent any leaking of fluid from the inside of the duct 30. The first barrel 40 is attached to the first shaft 32 by using e.g. clamp screws or retainer screws through the first barrel 40 that push against the first shaft 32. Thus, rotation of the turning knob 10 rotates the first shaft 32 inside the duct 30 and it also rotates the first barrel 40 that is attached to the first shaft 32.

The first barrel 40 is attached to a second shaft 50. The second shaft 50 is attached to the opposite end of the first barrel 40 relative to the first shaft 32. The first barrel 40 is attached to the second shaft 50 by using e.g. clamp screws or retainer screws through the first barrel 40 that push against the second shaft 50. Thus, rotation of the turning knob 10 rotates the first shaft 32 inside the duct 30, the first barrel 40 attached to the first shaft 32 and also the second shaft 50 attached to the first barrel 40. The second shaft 50 is, preferably, made of metal wires having a core of twisted steel wires and one or more layers of steel wires wound around the core. The second shaft 50 is preferably larger in diameter than the first shaft 32. This structure allows air, steam and other fluids to flow within the first shaft 32 itself and within the duct 30 so that fluids can flow from the hose connector 16 through valve 15, body 18, duct 30 and first shaft 32 all the way through the first barrel 40 and along the second shaft 50. The first barrel 40 preferably has cavities defined therein for accommodating or receiving an end of the first shaft 32 and an end of the second shaft 50. The cavities are connected to each other, thus forming a conduit through the first barrel 40 and enabling a fluid flow through the first barrel 40 via said cavities. The cavity to receive the first shaft 32 is slightly larger in diameter than the first shaft 32 to facilitate the flowing of air or steam through the first barrel 40, for example, at most 1 mm larger in diameter. The cavity to receive the second shaft 50 is slightly larger in diameter than the second shaft 50 to facilitate the flowing of air or steam through the first barrel 40, for example, at most 1 mm larger in diameter.

A second barrel 60 is attached on the other end of the second shaft 50, that is opposite to the end attached to the first barrel 40. The second barrel 60 is attached to the second shaft 50 by using e.g. clamp screws or retainer screws through the first barrel 60 that push against the second shaft 50. Thus, rotation of the turning knob 10 rotates the first shaft 32 inside the duct, the first barrel 40 attached to the first shaft 32, the second shaft 50 attached to the first barrel 40 and also the second barrel 60 attached to the second shaft.

The air or steam supplied into the installation device 2 is released to an area between the first barrel 40 and the second barrel 60. When the installation device is used in installation of a branch piece, an inflatable bladder is attached to the first barrel 40 and the second barrel 60. Tape, rope, cable ties, or similar removable attachment devices are used to attach the inflatable bladder to the barrels, preferably in such a way that the inflatable bladder surrounds the second shaft 50 from all sides. Thus, air or steam supplied through the hose connector 15 into the installation device, ends up in the inflatable bladder and inflates it. The inflatable bladder used in an installation of a branch piece is chosen based on the branch piece that is used.

The branch piece can be impregnated with various types of epoxy resin. When using epoxy resin which cures over time, the inflatable bladder can be inflated by supplying pressurized air through the hose connector 15. When a heat-curing epoxy resin is used, the inflatable bladder can be inflated with hot steam. Because the steam cools down quickly, a flow of steam has to be arranged. Therefore, the second barrel 60 can include a narrow outlet 62 which can be controlled with e.g. a screw valve 64 or some other valve type which controls the leak rate through the second barrel 60. For example, a threaded hole with a screw can be used when the outlet 62 opens in the threaded hole. The second barrel 60 preferably has a cavity defined therein for accommodating an end of the second shaft 50. The cavity 61 for receiving the end of the second shaft 50 is slightly larger in diameter than the second shaft 50 to facilitate the flowing of air or steam through the second barrel 60 if the outlet 62 is open, for example, at most 1 mm larger in diameter. When the screw blocks the outlet, no leaking occurs. Twisting or turning the screw open exposes the outlet allowing a leak through the outlet 62. The leak rate can be adjusted with the screw by controlling how much of the outlet is opened. The leak rate should be high enough to keep the temperature inside the inflatable bladder high enough so that the curing of the epoxy takes place but low enough to keep the inflatable bladder inflated. Also, the amount of steam supplied and its temperature can be adjusted accordingly.

When the installation device described herein is used, a single user can perform the lining of a branch. The expansion unit is prepared by attaching a suitable inflatable bladder and prepared branch piece to the first barrel 40 and the second barrel 60. Then, the prepared expansion unit 6 is pushed in a pipeline until it is in a branch which is to be lined with the branch piece. The duct is stiff enough so that it can be pushed into the pipeline and through any bends and curves in the pipeline. Once the expansion unit 6 of the installation device 2 is in the branch point of the pipeline, the user adjusts the branch piece into correct angle relative to the branch of the pipeline by turning the turning knob 10 which rotates the barrels 40, 60 of the expansion unit and therefore also rotates the inflatable bladder and the branch piece attached to the barrels 40, 60. The operation can be monitored with a camera. Once the branch piece is in the correct position, the inflatable bladder is inflated by controlling the valve 15 with the lever 14. Finally, when the branch piece is cured in its place, the hose is detached from the hose connector 16 and the valve 15 is opened which deflates the inflatable bladder and the installation device can be pulled out from the pipeline and used again.

An advantage of the embodiments of present invention compared to prior art installation systems is that one installation device with a single duct is used from one pipeline entry point instead of using separate air hoses, pushing rods and pulling cables from two or three pipeline entry points. The presented installation device enables operations of pushing, turning, inflating, steaming, deflating and pulling which significantly reduces time and personnel needed for lining a branch of a pipeline.

It is apparent to a person skilled in the art that the above exemplary embodiments are rather simple in structure and operation for the purposes of illustration. By following the model shown in this patent application, it is possible to construct different and even very complex solutions that utilize the inventive idea disclosed in this patent application.

I claim:

1. An installation device comprising:
    a body having an inlet defined therein for receiving fluids;
    a turning knob in operative engagement with the body and rotatable relative to the body, the turning knob being attached to a first shaft at one end of the first shaft and an opposite end of the first shaft being attached to a first barrel;
    a duct attached to said body and extending between the body and the first barrel forming a passage for fluids from the inlet of the body to an area between said first barrel and a second barrel;
    a second shaft being in operative engagement with the first barrel and extending between said first barrel and said second barrel; and
    wherein the duct and the first shaft are flexible and the first shaft comprises twisted steel wires.

2. The installation device of claim 1, wherein a valve controllable by a lever is attached to the body and a hose connector is attached to said valve.

3. The installation device of claim 1, wherein the body comprises a handle extending from the body.

4. The installation device of claim 1, wherein the first barrel has a cavity defined therein for accommodating the one end of the first shaft and another cavity defined therein for accommodating an end of the second shaft, said cavities being in fluid connection with one another, thus forming a conduit through said first barrel and enabling a fluid flow through said first barrel via said cavities.

5. The installation device of claim 1, wherein the second barrel has a cavity defined therein for accommodating an end of the second shaft.

6. The installation device of claim 1, wherein the second barrel includes a controllable outlet for controlling a leak rate through the second barrel.

7. An installation device comprising:
    a body having an inlet defined therein for receiving fluids;
    a turning knob in operative engagement with the body and rotatable relative to the body, the turning knob being attached to a first shaft at one end of the first shaft and an opposite end of the first shaft being attached to a first barrel;
    a duct attached to said body and extending between the body and the first barrel forming a passage for fluids from the inlet of the body to an area between said first barrel and a second barrel;
    a second shaft being in operative engagement with the first barrel and extending between said first barrel and said second barrel; and
    wherein the first shaft, the second shaft, the first barrel and the second barrel are rotatable relative to the body and the duct by turning of turning knob.

* * * * *